United States Patent [19]

Berlinger, Jr. et al.

[11] 3,949,626
[45] Apr. 13, 1976

[54] DIFFERENTIAL GEAR SYSTEM AND ACTUATOR ASSEMBLY

[75] Inventors: Bernard E. Berlinger, Jr., Meadowbrook; Harry Sulzer, Warminster, both of Pa.

[73] Assignee: Quaker City Gear Works, Inc., Huntingdon Valley, Pa.

[22] Filed: July 24, 1974

[21] Appl. No.: 491,616

[52] U.S. Cl. .................... 74/626; 74/625; 74/675; 74/665 C; 74/665 A; 74/606 R; 74/424.8 VA
[51] Int. Cl.². F16H 1/18; F16H 37/06; F16H 57/02
[58] Field of Search...... 74/757, 670, 665 P, 665 A, 74/665 C, 675, 625, 626, 606 R, 424.8 VA

[56] References Cited
UNITED STATES PATENTS

| | | | |
|---|---|---|---|
| 2,028,696 | 1/1936 | Beckwith | 74/675 |
| 2,151,176 | 3/1939 | Acker | 74/675 |
| 2,289,241 | 7/1942 | Bullock | 74/675 X |
| 2,719,478 | 10/1955 | Der Winden | 74/675 X |
| 2,968,971 | 1/1961 | Beadle et al. | 74/606 |
| 3,127,791 | 4/1964 | Roe | 74/675 |
| 3,150,536 | 9/1964 | Plume | 74/424.8 VA |
| 3,416,307 | 12/1968 | Wallis | 74/675 X |

FOREIGN PATENTS OR APPLICATIONS

| | | | |
|---|---|---|---|
| 907,528 | 10/1944 | France | 74/757 |
| 567,890 | 10/1957 | Italy | 74/675 |

Primary Examiner—Benjamin W. Wyche
Assistant Examiner—Parshotam S. Lall
Attorney, Agent, or Firm—John W. Logan, Jr.

[57] ABSTRACT

A differential gear system is disclosed for selectively transmitting power from one of two alternative power sources and which is particularly suited for use in actuating assemblies. The differential gear system includes an input gear rotatable about a sleeve assembly and in driving engagement with a spider gear assembly keyed to the sleeve assembly and driving an output gear also rotatable about the sleeve assembly. In one mode of operation, a first input gear system drives the differential input gear about the sleeve assembly while the sleeve assembly is held stationary by a second input gear system whereby power is transmitted through the spider gear assembly to the differential output gear. Alternatively, second input gear system drives the sleeve assembly while the first input gear system holds the differential input gear stationary whereby power is transmitted through the spider gear assembly to the differential output gear.

22 Claims, 9 Drawing Figures

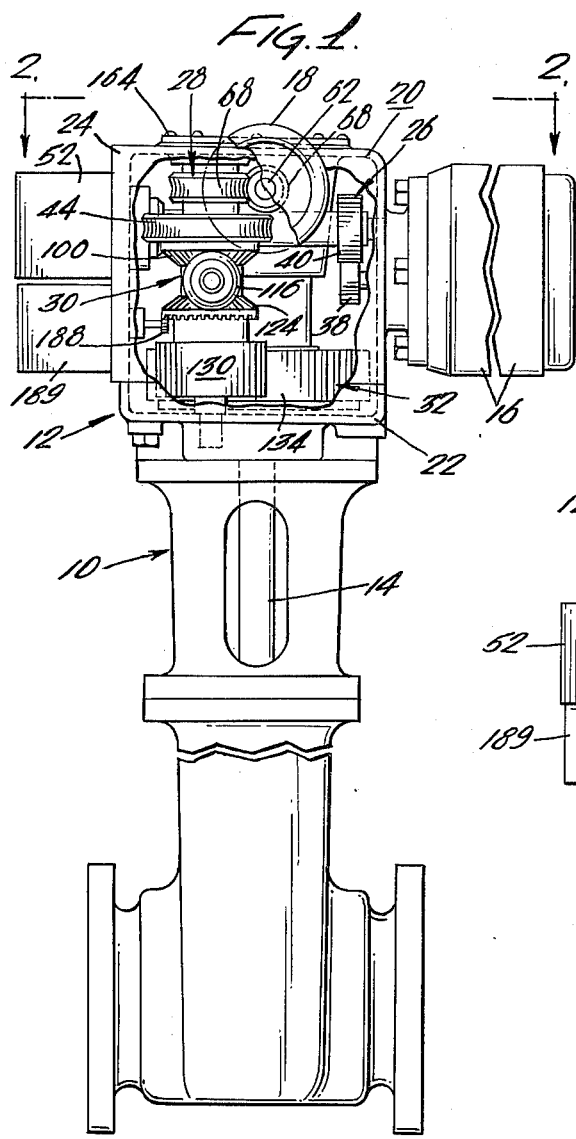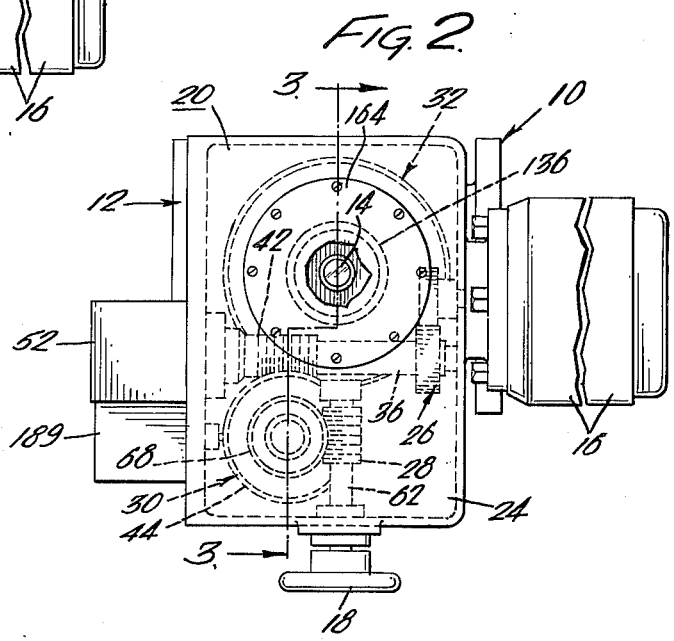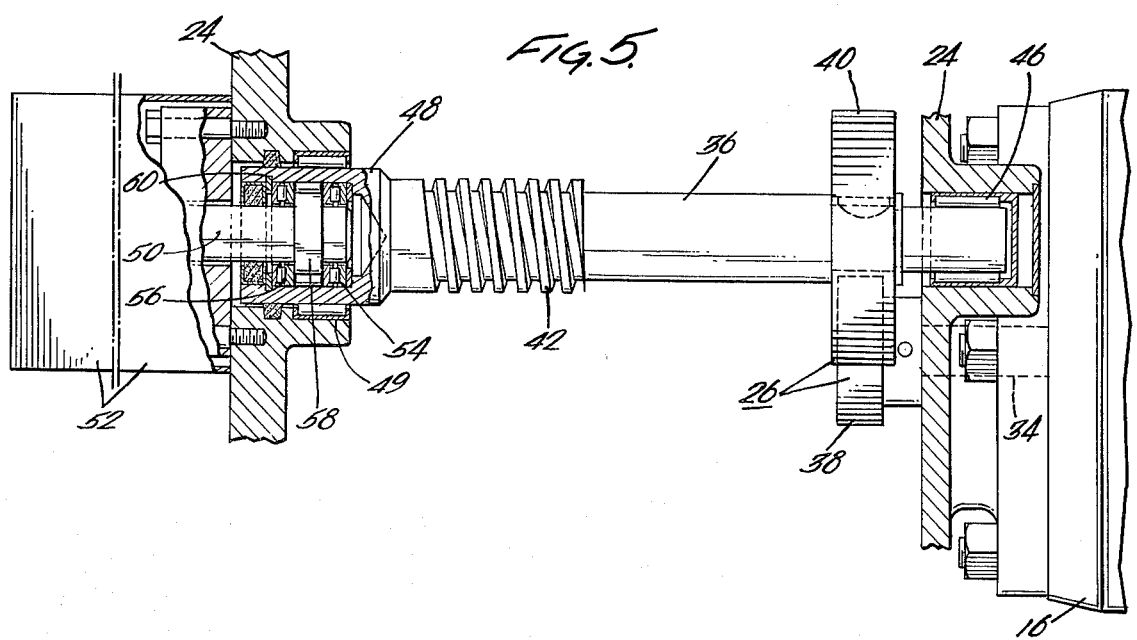

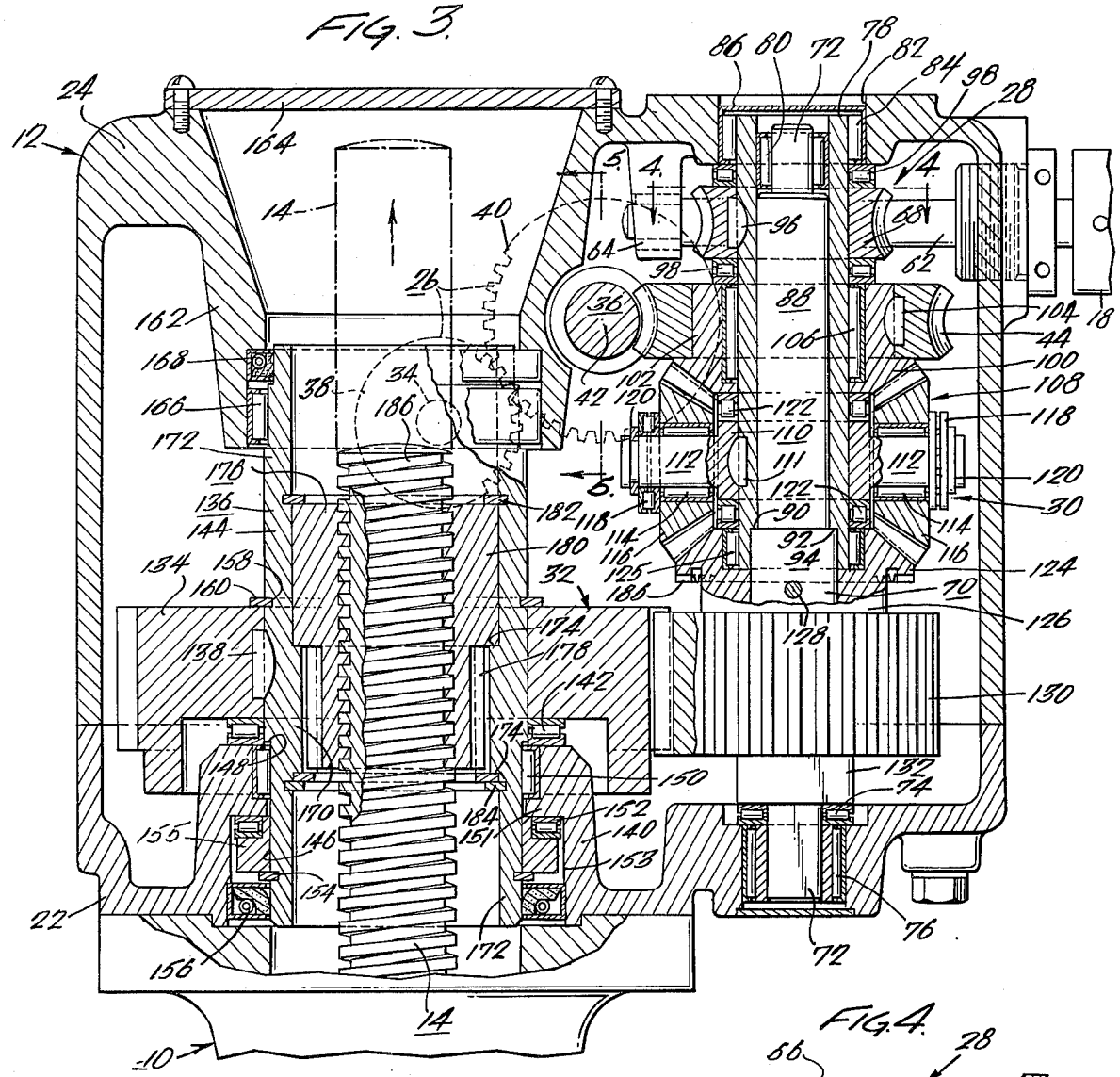
FIG. 3.
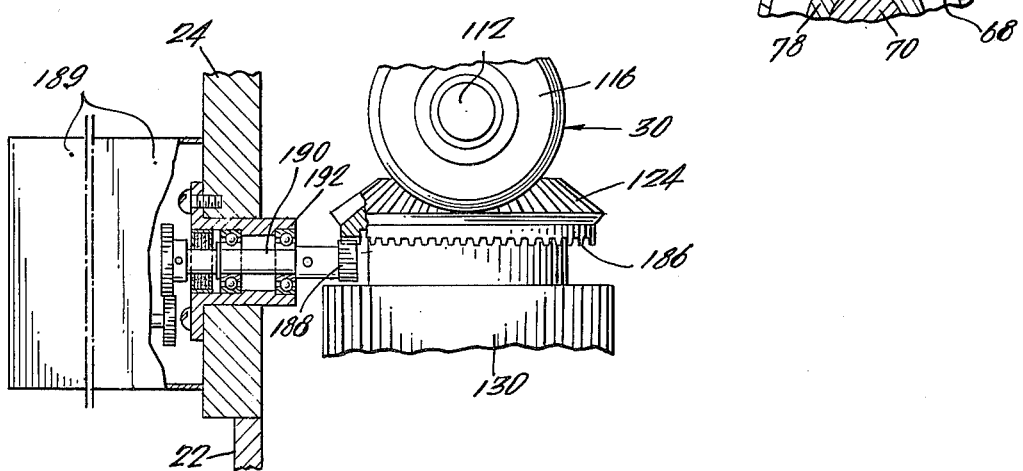
FIG. 4.
FIG. 6.

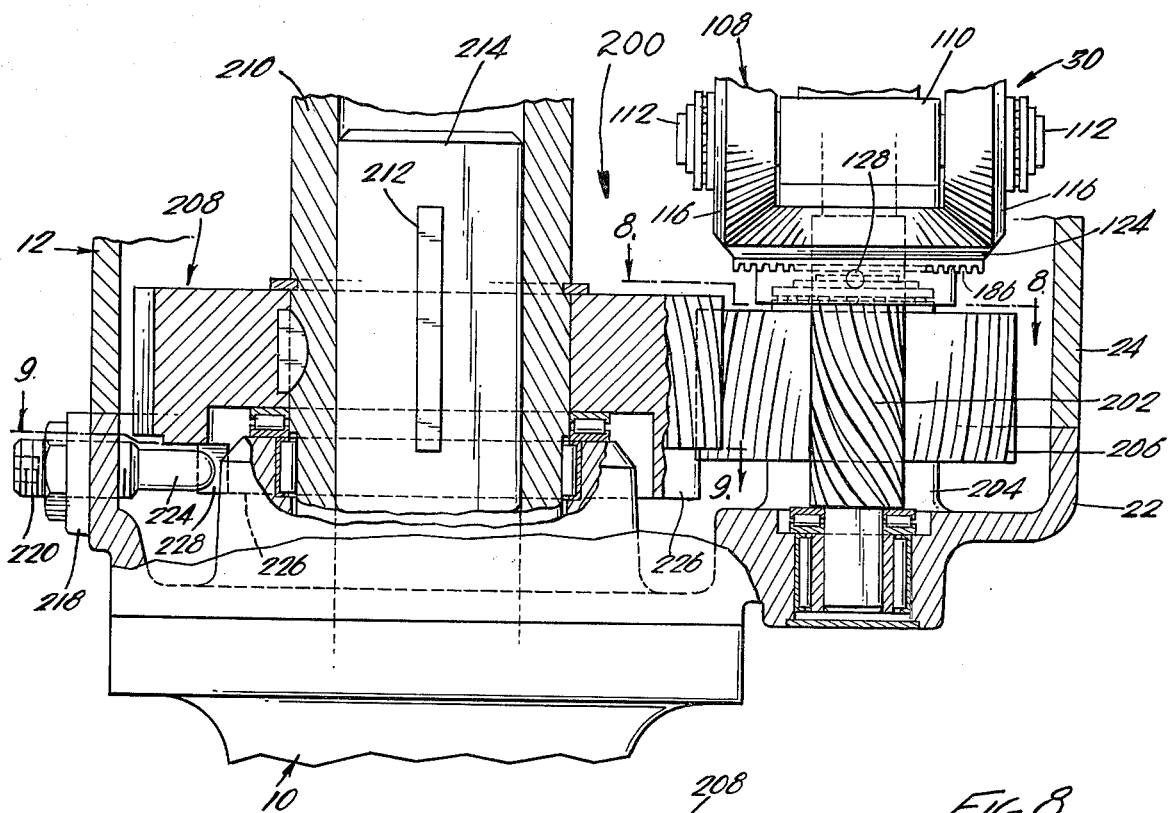
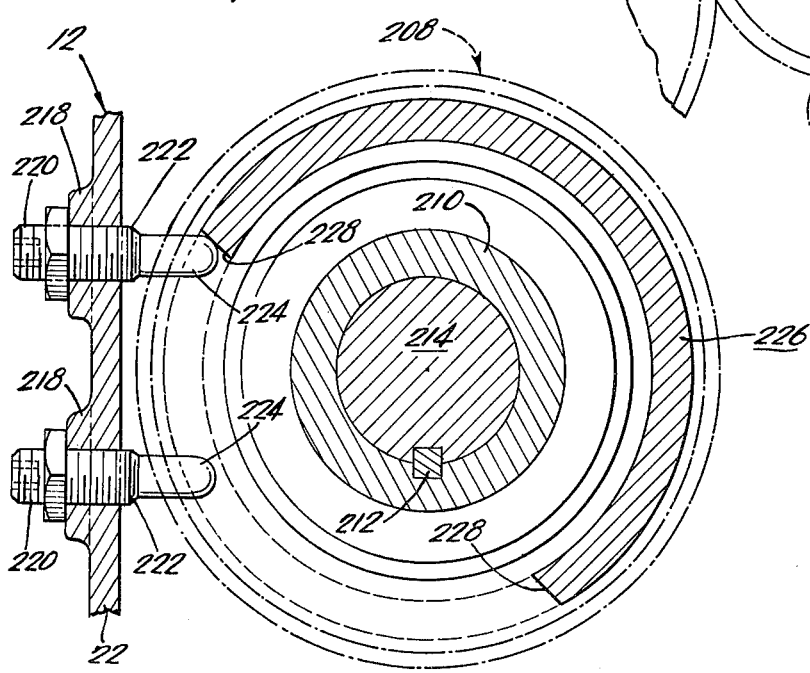

DIFFERENTIAL GEAR SYSTEM AND ACTUATOR ASSEMBLY

This invention relates to a differential gear system and, more particularly, to a differential gear system for selectively transmitting power from one of two alternative power sources and which is particularly useful in actuator assemblies.

Differential gear systems are used in a variety of applications in which alternate power sources are used selectively to drive an output mechanism. For example, actuator assemblies, particularly valve actuator assemblies, include a primary power source for controlling the operation of an associated device under normal conditions and an alternative power source, usually manually operated, for controlling the associated device in the event that the primary power source fails. Known actuating assemblies of the type noted generally include two input gear systems having complex lever and/or clutch assemblies operable to selectively engage the appropriate gear system with the output system. Use of the lever and clutch assemblies result in a relatively expensive gear system and, of course, actuating assembly. Further, use of clutch assemblies is relatively unreliable because malfunction of the clutch assemblies can occur. Accordingly, known actuator assemblies and their associated gear systems are not entirely satisfactory.

Additional factors adding to the expense of known actuating assemblies result from the usual arrangement of locating the differential gear system on the output shaft. Such an arrangement results in relatively high torque acting on the differential gear system which, in turn, requires that the overall actuator assembly be relatively large and expensive. Also, known actuator assemblies are mounted in associated housings with a thrust bearing arrangement for the output shaft that includes tapered roller bearings in opposite walls of the housing for cooperation with each end of an associated shaft. Since thrust is carried by opposite walls, the housings used with known actuator assemblies are generally heavy castings which, of course, are relatively expensive.

Finally, known valve actuator assemblies are not readily interchangeable for use with different types of valves requiring different speeds. For example, output speeds for controlling gate valves or similar valves controlled by multi-turn stems may vary between 15 to 60 rpm while output speeds for plug, ball, butterfly valves or other similar valves controlled by a stem rotating through a limited arc, may vary between 0.25 to 2 rpm. Because of the significant difference in the output speeds required for the different types of valves, it has been common in the art to utilize valve actuator assemblies having a gear ratio suitable for use with gate valves and to provide separate adapter gear systems mounted between the actuator assembly and the valve which decreases the output speeds to a range suitable for use with plug, ball or butterfly valves. Obviously, arrangements of this type with the requirement of extra apparatus are relatively expensive and may not be usable in applications wherein size requirements are critical.

Accordingly, it is an object of this invention to provide a differential gear system selectively transmitting power from alternate power sources to an output without utilizing clutches, levers and similar apparatus.

It is another object of this invention to provide an actuator assembly including a differential gear system selectively transmitting power from alternate power sources to an output with positive engagement between the input gear systems and the differential gear system.

It is yet another object of this invention to provide an actuator assembly that is usable in different applications requiring significantly different output speeds without requiring major modification of the assembly.

Finally, it is an object of this invention to provide a differential gear system and an actuator assembly that are versatile, compact, economical and reliable.

These and other objects of this invention are accomplished by providing a differential gear system including an input gear rotatable about a sleeve assembly and in driving engagement with a spider gear assembly carried on the sleeve assembly and in driving engagement with an output gear. The first input gear is operative to drive the output gear through the spider gear assembly while the sleeve assembly is stationary. Alternatively, the sleeve assembly can be rotated to drive the spider gear assembly and, in turn, the output gear while the input gear is stationary.

More particularly, the spider gear assembly includes a spider member keyed to the sleeve assembly and spider gears carried on the spider member and rotatable about an axis perpendicular to the axis of the sleeve assembly. Power transmitted through a first input gear system is transmitted through the input gear which rotates about the sleeve assembly driving the spider gears which in turn, drives the output gear. Power transmitted through a second input gear system drives the sleeve assembly and the spider member, the latter driving the spider gears which, in turn, drive the output gear. When the first input gear system is operative, the second input gear system holds the sleeve assembly stationary and when the second input gear system is operative, the first input gear system holds the input gear stationary.

When a differential gear system in accordance with this invention is used in an actuator assembly the differential and output shafts are mounted in the housing such that the major thrust forces are taken up in the base of the housing. Thus, the housing may be made in two parts, the base and an upper cover and the latter may be made of relatively light weight inexpensive material. Also, use of a differential gear system in accordance with this invention in an actuator assembly allows the actuator assembly to be readily changeable for use in different applications requiring different output speeds by requiring only minor changes in the output gear system driven by the differential output gear.

For a better understanding of the invention, reference is made to the following description of a preferred embodiment, taken in conjunction with the figures of the accompanying drawings, in which:

FIG. 1 is a front view of a valve and actuator assembly in accordance with this invention with a portion of the actuator assembly housing broken away to illustrate a differential gear system in accordance with this invention;

FIG. 2 is a top view of the actuator assembly and taken along line 2—2 of FIG. 1;

FIG. 3 is a section view of the actuator assembly taken along line 3—3 of FIG. 2 and clearly illustrating a differential assembly in accordance with this invention;

FIG. 4 is a section view taken along line 4—4 of FIG. 3 and illustrating a power input system usable with the invention;

FIG. 5 is a side view, partially in section, illustrating another power input system usable with the invention;

FIG. 6 is a right-side view of FIG. 3, with the housing removed, and illustrating the output of a differential gear system in accordance with this invention;

FIG. 7 is a partial section view illustrating another embodiment of an output system usable with the invention;

FIG. 8 is a schematic plan view taken along line 8—8 of FIG. 7; and,

FIG. 9 is a partial section view taken through the actuator assembly along line 9—9 of FIG. 7.

Referring now to the drawings, FIG. 1 illustrates a valve 10 and an actuator assembly 12 in accordance with this invention. While illustrated with a valve, it should be expressly understood that actuator assembly 12 is usable with various other devices. Also, it should be understood that specific details of valve 10 need not be illustrated except for a stem 14 whose rotation is controlled by actuator assembly 12 to control the opening and closing of the valve. Power is supplied to actuator assembly 12 through either a motor 16 or a manually operated hand wheel 18. Before proceeding with a more detailed description of the invention, it will be noted that actuator assembly 12 is enclosed in a housing 20 including a base 22 and an upper cover 24.

Actuator assembly 12 includes a first input gear system 26 which, in the preferred embodiment disclosed herein, is driven by motor 16, and a second input gear system 28 which, in the preferred embodiment disclosed herein, is driven by hand wheel 18 and functions as an emergency system to be used in the event that either the motor or the first input gear system fails. Motor 16 can be electric, hydraulic or any other suitable type. Both of the input gear systems are in positive driving engagement with a differential gear system 30 which is in driving engagement with an output gear system 32. Stem 14 is operatively connected to output gear system 32 for controlling the operational mode of valve 10. As will be fully explained hereinafter, power will be selectively transmitted through either of the input gear systems to the differential gear system and, thus, to the output gear system.

Referring particularly to FIGS. 1, 2 and 5 of the drawing, the first input gear system 26 includes a motor output shaft 34 driven by motor 16 and a first input drive shaft 36 mounted in opposite walls of upper cover 24 and parallel to the motor output shaft. Suitable speed reducing gears 38 and 40 in the form of conventional spur gears are carried on shafts 34 and 36, respectively, so that shaft 36 rotates at a different speed than shaft 34. Formed on shaft 36 is a first input worm 42 in driving engagement with a first input worm wheel 44 to transmit power from motor 16 to differential gear system 30.

Referring particularly to FIG. 5, first input drive shaft 36 is journalled through the wall of cover portion 24 adjacent motor 16 with a suitable bearing assembly 46. At its other end first input shaft 36 includes an enlarged cylindrical portion 48 formed with a bore 49 to receive a shaft 50 extending from a thrust limiting switch assembly 52. Suitable bearing assemblies 54 and 56 are mounted between bore 49 and shaft 50 are spaced apart by a radially extending flange 58 formed on the shaft and are retained in place by a retaining ring 60 so that relative axial movement of the shafts is precluded. If axial thrust in shaft 36 is excessive, its axial movement is transmitted to shaft 50, the movement of which is sensed by thrust limiting switch assembly 52 to shut off motor 16. It should be noted that thrust limiting switch assembly 52 may be of any suitable type known in the art and that a specific description thereof need not be provided.

Referring specifically to FIGS. 1, 2 and 4, second input gear system 28 is illustrated and includes a second input drive shaft 62 one end of which extends through a wall of upper cover 24 and is secured at that end to hand wheel 18 for rotation therewith. At its other end, second input drive shaft 62 is carried in a journal 64 extending downwardly from the top wall of upper cover 24. Intermediate its ends, second input drive shaft 62 is formed with a second input worm 66 in driving engagement with a second input worm wheel 68 for transmitting power from hand wheel 18 to differential gear system 30.

As most clearly shown in FIG. 3 of the drawing, a drive shaft 70 is rotatably mounted between base 22 and top wall of upper cover 24. Each end of drive shaft 70 is formed with a stub portion 72 and the lower stub portion is mounted in base 22 by a suitable needle bearing assembly 74 and roller bearing assembly 76; the upper stub portion is mounted within a rotatable sleeve member 78 through a suitable roller bearing assembly 80. At its upper end, sleeve member 78 is received through an opening 82 in upper cover 24 with a roller bearing assembly 84 and a retaining cap 86. Sleeve member 78 is generally cylindrical and extends axially along a reduced diameter portion 88 of shaft 70 and is formed with an internal shoulder 90 seating on a shoulder 92 formed by the intersection of reduced diameter portion 88 and an enlarged diameter portion 94 of the shaft. Thus, shaft 70 and sleeve member 78 are rotatable relative to each other. At this point it should be noted that second input worm wheel 68 is fixed to the outer surface of sleeve member 78 for rotation therewith by a suitable key arrangement 96. Suitable roller bearng assemblies 98 are located on opposite sides of second input worm wheel 68.

Still referring primarily to FIG. 3, differential gear system 30 is illustrated and includes a differential input bevel gear 100 formed with a cylindrical extension 102, the outer surface of which is fixed to first input worm wheel 44 by a suitable key arrangement 104. An axially extending bore formed through input bevel gear 100 and its cylindrical extension 102 fits over the outer surface of sleeve member 78 and is spaced therefrom by a roller bearing assembly 106 so that the input bevel gear is rotatable about the sleeve member. Also mounted on sleeve member 78 and below input bevel gear 100 is a spider gear assembly 108 including a central hub 110 secured to the outer surface of the sleeve member by a suitable key arrangement 111 and further including a pair of spindles 112 extending in opposite directions along an axis perpendicular to the axis of the sleeve member. Any suitable number of spindles may be provided depending on the torque to be transmitted. Rotatably carried on each spindle 112 by a suitable roller bearing assembly 114 is a spider bevel gear 116 in meshing engagement with input bevel gear 100. Spider bevel gears 116 are secured to the spindles 112 by suitable roller bearing assemblies 118 and retaining rings 120. Each axial end of central hub 110 seats on a suitable roller bearing assembly 122.

Finally, differential gear system 30 includes a differential output bevel gear 124 meshing with spider bevel gears 116 and rotatably mounted about the lower end of sleeve member 78 by a roller bearing assembly 125. Integrally formed with output bevel gear 124 is a cylindrical extension 126 fixed to enlarged diameter portion 94 of shaft 70 by a pin member 128. Thus, rotation of output bevel gear 124 causes rotation of shaft 70.

In the embodiment illustrated in FIG. 3, output gear system 32 includes a first output gear 130 in the form of a conventional spur gear suitably keyed to enlarged diameter portion 94 of shaft 70 and seated on the upper face of a bushing 132 seated on bearing assembly 74. Meshing with first output gear 130 is a second output gear 134 also in the form of a spur gear which is fixed to an output sleeve member 136 by a suitable key arrangement 138. Both second output gear 134 and output sleeve member 136 are rotatably mounted with respect to a boss 140 projecting upwardly from base 22. Accordingly, one side of second output gear 134 is counterbored and seats on the top face of boss 140 through a needle thrust bearing arrangement 142 and the outer surface of output sleeve member 136 is formed with an enlarged diameter portion 144 intermediate reduced diameter end portions 146. Shoulders 148 are defined at the intersection of the enlarged and reduced diameter portions 144 and 146 and the lowermost reduced diameter portion is received within boss 140 with the lowermost shoulder seated on the top of a roller bearing assembly 150 interposed between the lowermost reduced diameter portion and a radial lip 151 on the boss. Below radial lip 151, the boss 140 is formed with an enlarged diameter portion 153 in which is carried a needle bearing assembly 152 secured by a retaining ring 154 carried on the outer surface of reduced diameter portion 146 of output sleeve member 136. Thrust acting through output sleeve member 136 is taken up by retaining ring 154 through the L-shaped support ring 155 or through the lip 151 of boss 140 depending on the direction in which it is acting. A conventional seal assembly 156 is located between retaining ring 154 and the upper surface of the valve housing. Seal assembly 156 is located in boss 140 adjacent the valve housing. Intermediate shoulders 148 and on the enlarged outer diameter portion 144 of sleeve member 136 is formed a groove 158 which cooperates with a suitable retaining ring 160 for securing second output gear 134 against axial movement relative to the sleeve member. The uppermost reduced diameter portion 146 of output sleeve member 136 is rotatably received within a boss 162 projecting downwardly from the top wall of cover portion 24 and providing an access opening normally closed by a removable cover member 164. A suitable roller bearing assembly 166 and seal assembly 168 cooperate between sleeve member 136 and boss 162. Since all thrust is taken up in base 22, the mounting of the upper end of output sleeve member 136 and boss 162 includes no thrust absorbing arrangement.

Along its inner surface output sleeve member 136 is formed with a reduced diameter portion 170 intermediate enlarged diameter end portions 172, 172 forming upper and lower shoulders 174. Seated on upper shoulder 174 is an internally threaded nut member 176 splined as shown at 178 to the reduced diameter portion 170 of output sleeve member 136 for precluding relative rotation. Nut member 176 includes an enlarged diameter portion 180 and, if desired, the upper enlarged diameter portion 172 of the sleeve member could define a polygonal configuration and the outer surface of enlarged diameter portion 180 of the nut member could define a mating configuration to further preclude rotation between the sleeve member and the nut member. In addition, a suitable retaining ring arrangement 182 is provided between the top of enlarged diameter portion 180 of nut member 176 and the upper enlarged diameter portion 172 of sleeve member 136 whereby axial movement of the nut member relative to the sleeve member is precluded. Further, a retaining ring arrangement 184 is provided at the lower end of nut member 176 and is carried in the lower enlarged diameter portion 172 of sleeve member 136. Accordingly, it can be seen that the nut member 176 is rotatable with sleeve member 136, but is precluded from relative axial movement. The upper end of valve stem 14 is formed with a thread 186 that cooperates with the internal thread formed on nut member 176 such that rotation of the nut member causes the stem to move axially in an upward or downward direction depending on the direction of rotation of the nut member.

From the preceding description, operation of a differential gear system and actuator assembly in accordance with this invention should be clear. If power is to be transmitted from motor 16 to stem 14 to operate the valve included in valve assembly 10, the motor is actuated driving first input shaft 36 through the speed-reducing gears 38 and 40. Rotation of first input shaft 36 drives first input worm wheel 44 through first input worm 42 and causes rotation of differential input bevel gear 100 about sleve member 78 while the sleeve member is held against rotation by second input gear system 28, that is, by engagement of second input worm 66 and second input worm wheel 68. As input bevel gear 100 is driven, it drives spider bevel gears 116 about their respective spindles 112 which, in turn, drive differential output bevel gear 124. Rotation of differential output bevel gear 124 is transmitted through pin member 128 to shaft 70 which drives first output spur gear 130 and second output spur gear 134. As second output spur gear 134 rotates it drives output sleeve member 136 and nut member 176. Since nut member 176 is restrained against axial movement, stem 14 is driven in either an upward or downward direction, depending on the direction of rotation of shaft 34 to open or close the valve.

Should motor 16 or first input gear system 26 fail, the valve could be actuated manually through hand wheel 18 which provides power through shaft 62, second input worm 66 and second input worm wheel 68. Since worm wheel 68 is keyed to sleeve member 78, rotation of the worm wheel causes corresponding rotation of the sleeve member which is transmitted through key arrangement 111 to central hub 110 of spider assembly 108. It should be noted that as sleeve member 78 is rotated differential input bevel gear 100 is held stationary by first input gear system 26, that is by first input worm 42 and first input worm wheel 44 along with speed reducing gears 38 and 40. As central hub 110 rotates, it rotates spindles 112 about the axis of sleeve member 78 rotating spider bevel gears 116 around differential input bevel gear 100, now stationary. Rotation of spider bevel gears 116 drives output bevel gear 124 and of course, first and second output gears 130 and 132, output sleeve member 136 and internally threaded nut member 176 to control valve stem 14 in the same manner as described with respect to the operation of the actuator assembly by motor 16.

Both of the input gear systems 26 and 28 are, in effect, self-locking, that is, operation of one will not effect the other and both are in positive engagement with the differential system at all times so that the reliability of the system is assured. Moreover, operation of second input system 28 by hand wheel 18 is relatively safe since, if motor 16 inadvertently becomes operative, differential input bevel gear 100 will rotate and the spindles 112 will no longer rotate about the axis of sleeve member 78. Accordingly, no power from motor 16 is transmitted back through second input gear system 28 to hand wheel 18 which could injure an operator.

Axial thrust limiting switch assembly 52, as noted previously, is operative to deactivate motor 16 should thrust developed on first input shaft 36 become excessively high. In addition, a position limiting switch assembly 189 is also provided which functions to shut off motor 16 when the valve reaches its desired position, either open or closed. Referring to FIG. 6, differential output bevel gear 124 is formed on its lower face with gear teeth 186 which cooperates with a pinion gear 188 carried on one end of a shaft 190 extending through a wall of upper cover 24 of housing 20. A suitable bearing assembly 192 is provided between shaft 190 and cover portion 24. The other end of shaft 190 is operatively connected to switch assembly 189 which can be of any suitable type. Rotation of differential output bevel gear 124 drives switch assembly and when valve 10 reaches its desired position, the switches are activated to shut off motor 16.

The preceding description of a preferred embodiment of a valve actuator assembly in accordance with this invention includes an output gear system 32 particularly adapted for use with valves controlled by multi-turn axially movable stems. With only slight modification to output gear system 32, the actuator assembly disclosed in FIGS. 1 through 6 can be readily adapted for use with valves controlled by rotary stems movable through a limited arc, for example, 90°. Examples of valves controlled by stems of this type include plug, ball and butterfly valves. Referring to FIGS. 7 and 8, an output gear system 200 for use with rotary stems is disclosed and is somewhat similar to output gear system 32 illustrated in FIG. 3 of the drawing. Accordingly, like reference numerals will be used for like parts. In this embodiment, the lower end of drive shaft 70 is formed with a helical gear 202 having a limited number of teeth. Preferably, the number of teeth is less than five and may be in accordance with the disclosure of U.S. Pat. No. 3,247,736 issued to Roth on Apr. 26, 1966 the disclosure of which is incorporated herein by reference. Mounted in base 22 of housing 20 on a spindle (not shown) extending through boss 204 adjacent helical gear 202 is a helical idler gear 206 which meshes with a helical output gear 208. In a manner similar to the securing of spur gear 134 to output sleeve member 136 in the embodiment of the invention disclosed in FIG. 3, helical output gear 208 is keyed to a sleeve member 210. Stem 214 is connected to the valve in valve assembly 10.

In operation, differential output gear 124 drives helical output gear 202 through pin 128 which, in turn, drives idler helical gear 206 and helical output gear 208. Rotation of output gear 208 drives output sleeve member 210 which drives stem 214 through key arrangement 212.

As in the embodiment illustrated in FIG. 3, position switch assembly 189 controls the operation of motor 16 and, accordingly, the position of the valve. In accordance with another aspect of this invention, a secondary mechanical stop system is disclosed. Carried in a pair of spaced apart internally threaded boss members 218 on a side wall of base 22 are a pair of stop members 220 each including a threaded portion 222 cooperating with the internal thread of its associated boss member and a stop finger 224 projecting into the housing adjacent the lower end of helical output gear 208. Depending below the face of gear 208 is a skirt member 226 extending around a limited extent of the circumference of the gear and formed with inclined end faces 228 as seen in FIG. 9 of the drawings. In the embodiment illustrated in FIG. 9, skirt member 226 extends through an arc of about 180° for limiting movement of the gear and corresponding movement of the valve controlled by stem 214. Stop members 220 are adjusted to engage inclined end faces 228 of skirt member 226 shortly after position limiting switch assembly 189 shuts off motor 16 in either the open or closed position of the valve. Thus, if position limit switch assembly 189 malfunctions, one of the stop members 220 engages an end face 228 limiting movement of helical gear 208 and also of the valve. Simultaneously torque builds up in first input shaft 36 and will develop sufficient thrust so that motor 16 would be shut off by thrust limiting switch assembly 52. Also, during manual operation of actuator assembly 12 and valve 10 by handwheel 18, stop members 220 define stop positions so that the valve cannot be forced past its associated valve seat. Accordingly, the secondary stop system functions to protect both motor 16 and valve 10. It should be noted that skirt member 226 could extend through various arcs depending on the particular valve to be controlled. For example, if skirt member 226 extends through an arc of about 180° and only one stop member 220 were utilized, protection would be provided for butterfly valves such that the butterfly valve could not rotate through its seat.

From the foregoing it can be seen that a differential gear system is provided to transmit power from alternative power sources without utilization of expensive clutches or levers, which is highly reliable since both input gear systems are positively engaged with the differential gear system at all times and, finally, which is relatively safe since the input gear systems are, in effect, self-locking. In addition, it can be seen that the mounting of the differential output shaft and the output assembly are such that all thrust is taken up in the base of the housing allowing the upper cover portion to be made of relatively light weight and inexpensive material. It can also be seen that a conversion of an actuator assembly in accordance with this invention from a system providing a relatively high output speed to a relatively low output speed can be readily accomplished by the addition of an idler gear and the replacement of minimal number of gears in the output system and without use of additional adapter systems. Finally, it can be seen that when the output of the actuator assembly is through a limited arc, a secondary mechanical stop system is provided which adds to the reliability of the assembly.

While in the foregoing, various embodiments of the invention have been disclosed, it should be apparent that various modifications will be obvious to one skilled in the art and are included within the intended scope of the invention as recited in the appended claims.

We claim:

1. A differential gear system for transmitting power from either of two alternate power sources to an output system, said differential gear system comprising an input gear means rotatable about a sleeve member, spider gear means fixed to said sleeve member and being in engagement with said input gear means, and output gear means rotatable about said sleeve member and being in engagement with said spider gear means, said input gear means being operative to drive said output gear means through said spider gear means while said sleeve member is stationary, said sleeve member being operative to drive said output gear means through said spider gear means while said input gear means is stationary.

2. A differential gear system in accordance with claim 1 wherein said spider gear means includes a central hub portion keyed to said sleeve, at least one journal extending radially from said cylindrical portion along an axis perpendicular to said sleeve member and a bevel gear rotatably carried on each journal.

3. A differential gear system in accordance with claim 1 wherein said spider gear means includes a spider member keyed to said sleeve member and spider gears carried on said spider member.

4. A differential gear system in accordance with claim 2 wherein said spider gears are bevel gears and wherein said input and output gear means are bevel gears.

5. An actuator assembly adapted to be selectively driven from alternative power sources, said assembly comprising first input gear means and second input gear means, each of said input gear means being adapted to be driven by a separate power source, output gear means adapted to transmit power to an associated apparatus, and differential gear means interposed between said input gear means and said output gear means, said differential gear means including differential input gear means rotatable about a sleeve member, spider gear means fixed to said sleeve member, and differential output gear means rotatable about said sleeve member, said first input gear means being in driving relationship with said differential input gear means for driving said spider gear means and said second input gear means being in driving relationship with said sleeve member for driving said spider gear means.

6. An actuator assembly in accordance with claim 5 wherein said spider gear means includes a spider member keyed to said sleeve member, said spider member having a pair of spindles extending in opposite directions therefrom, and spider gears rotatably carried on said spindles for rotation about an axis perpendicular to the axis of said sleeve member.

7. An actuator assembly in accordance with claim 5 wherein said second input gear means holds said sleeve member stationary when said first input gear means is driving said spider gear means and wherein said first input gear means holds said differential input gear means against rotation when said second input gear means is driving said sleeve member.

8. An actuator assembly in accordance with claim 5 wherein said spider gear means includes a spider member keyed to said sleeve member and spider gears rotatable on said spider member.

9. An actuator assembly in accordance with claim 6 wherein said first input gear means includes a gear member keyed to said differential input gear means and wherein said second input gear means includes a gear member keyed to said sleeve member whereby when said first input gear means is operative said sleeve member and said spider member are held stationary by said second input gear means and when said second input gear means is operative said differential input gear means is held against rotation by said first input gear means.

10. An actuator assembly in accordance with claim 5 including a housing comprising a base and a cover, said output gear means including an output drive assembly rotatably mounted in a boss formed on said base such that all of the thrust developed in said output drive assembly is taken up in said boss.

11. An actuator assembly in accordance with claim 10 wherein said boss is formed with a lip and wherein said output drive assembly is retained in said boss by a retaining ring assembly such that the thrust in said output drive assembly is taken up by said base.

12. An actuator assembly in accordance with claim 10 wherein said cover is formed of lightweight material.

13. An actuator assembly in accordance with claim 5 wherein said output gear means includes a first output gear driven by said differential output gear means and a second output gear arranged to be driven by said first output gear.

14. An actuator assembly in accordance with claim 13 wherein said second output gear is engaged by said first output gear.

15. An actuator assembly in accordance with claim 14 wherein said second output gear is fixed to an output sleeve member including an output nut for driving an output stem.

16. An actuator assembly in accordance with claim 13 wherein said first output gear is a helical gear having a limited number of teeth.

17. An actuator assembly in accordance with claim 16 wherein said first output gear is engaged with an idler gear which is also engaged with said second output gear.

18. An actuator assembly in accordance with claim 13 wherein stop means is associated with said second output gear.

19. An actuator assembly in accordance with claim 18 wherein said stop means includes a skirt member formed on said second output gear and extending circumferentially around a portion of said second gear means.

20. An actuator assembly in accordance with claim 19 wherein said stop means further includes at least one stop member adjacent said skirt member.

21. An actuator assembly including an output drive means for controlling an associated device, said output drive means being rotatably mounted in a boss, said boss being formed with a radial lip and said output drive means being fixed to said boss by a retaining ring, bearing means mounted about said output drive means intermediate said radial lip and said retaining ring whereby thrust in said output drive means is taken up by said boss or said retaining ring.

22. An actuator assembly adapted to be selectively driven from alternative power sources, said assembly comprising first and second input gear means, each of said input gear means being adapted to be driven by a separate power source, output gear means adapted to transmit power to an associated apparatus, and differential gear means for transmitting power from either of said input gear means to said output gear means, said differential gear means including differential input gear means rotatable about a sleeve member and differential output gear means rotatable about said sleeve member and being in driving relationship with said output gear means, said differential gear means further including spider gear means in meshing relationship with said differential input and output gear means and being carried on a spider member keyed to said sleeve member, said first input gear means being in driving relationship with said differential input gear means and said second input gear means being in driving relationship with said sleeve member, rotation of said first input gear means driving said differential input gear means and said spider gear means while said second input gear means holds said sleeve member and said spider member against rotation whereby said spider gear means drives said differential output gear means and said output gear means, rotation of said second input gear means driving said sleeve member and said spider member while said first input gear means holds said differential input gear means against rotation whereby said spider gear means drives said differential output gear means and said output gear means.

* * * * *